T. W. RITCHIE.
PROCESS OF MANUFACTURING CONTAINERS.
APPLICATION FILED MAR. 24, 1921.
1,390,644. Patented Sept. 13, 1921.
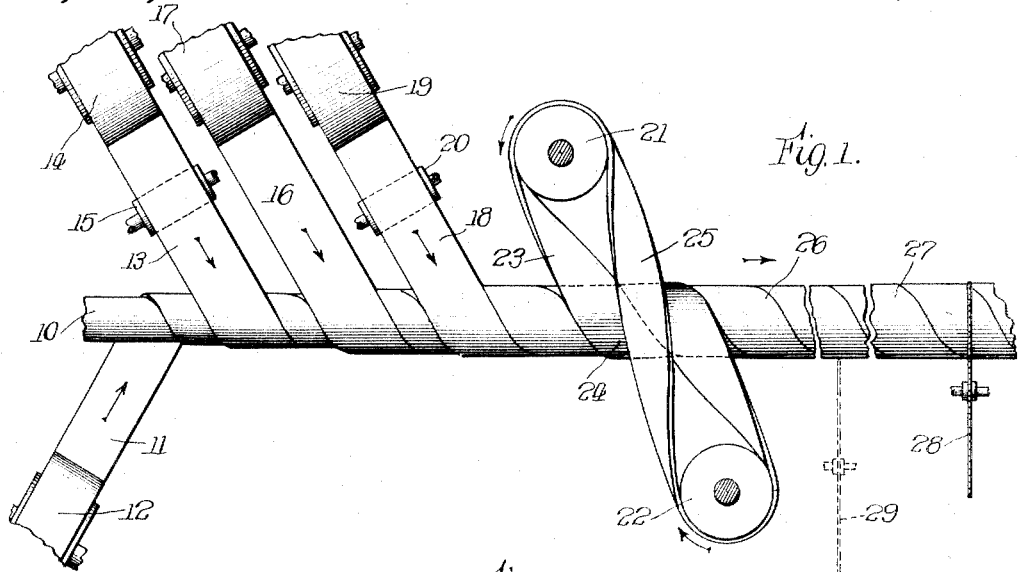
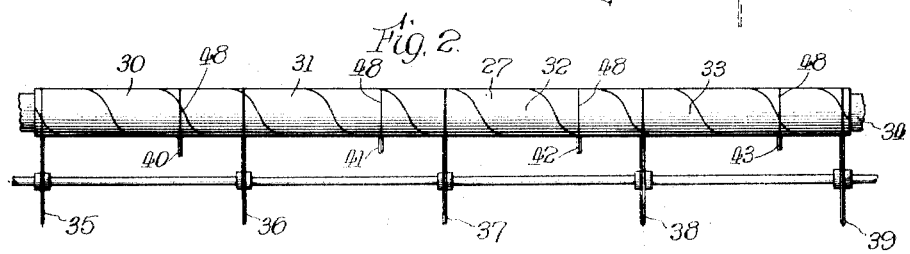
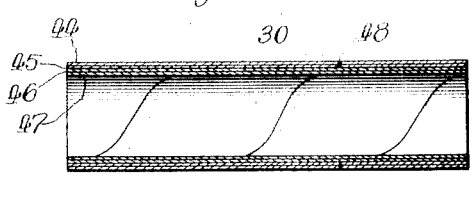
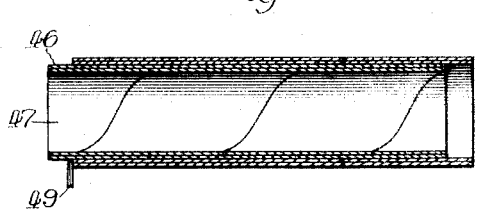
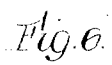
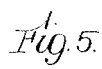
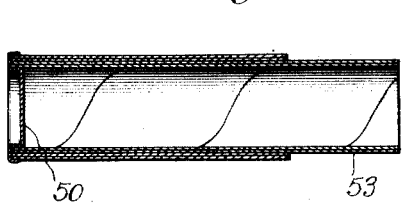
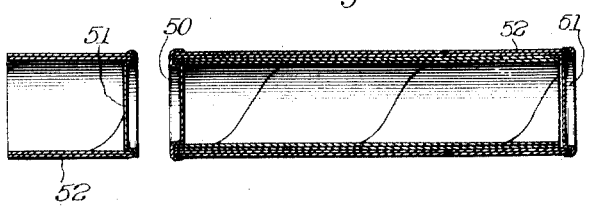
Witness:
(signature)
Inventor:
Thomas W. Ritchie
By Walter M. Fuller
Atty.

UNITED STATES PATENT OFFICE.

THOMAS W. RITCHIE, OF GLENCOE, ILLINOIS, ASSIGNOR TO W. C. RITCHIE & COMPANY, OF CHICAGO, ILLINOIS, A CORPORATION OF ILLINOIS.

PROCESS OF MANUFACTURING CONTAINERS.

1,390,644.  Specification of Letters Patent.  Patented Sept. 13, 1921.

Application filed March 24, 1921. Serial No. 455,334.

To all whom it may concern:

Be it known that I, THOMAS W. RITCHIE, a citizen of the United States, residing at Glencoe, in the county of Cook and State of Illinois, have invented certain new and useful Improvements in Processes of Manufacturing Containers, of which the following is a specification.

The present invention concerns the manufacture of containers or receptacles, particularly though not exclusively, cylindrical ones, and especially those adapted to be used as mailing tubes.

One purpose or aim of the invention resides in the provision of a simple, effective, and rapid method of producing such articles of trade, one salient feature being the economy of production when the novel method of this invention is availed of.

A further or additional object of the invention is the manufacture of such containers having covers or caps fitting over suitable necks of the container bodies, all parts of the completed product being provided with substantially no waste of material.

In performing this process according to its preferred method of procedure, a multilayer spirally-wound paste-board or similar tube is made in the usual and customary manner except that two of the layers are not glued together.

Then such a length of tubing is cut into several shorter pieces or units, and each of the latter between its ends is cut completely around its periphery through the outer layers only to the place of the unglued joint.

Then the inner layers are displaced or shifted longitudinally a slight amount away from what is to constitute the top of the so-called mailing tube and a portion of such inner layers is cut off.

Then a bottom is affixed to one end and a top to the other thereby completing the article of commerce which has a main body with a neck and a cover fitted snugly or closely over such neck.

Practically no material is wasted or lost since that part of the structure forming the flange or rim of the cover is the complement of the neck portion of the main body in the original length of tubing.

In order that those skilled in this art may have a full and complete understanding of the manner of constructing these containers or receptacles in accordance with the principles of this invention and may also fully understand the structural characteristics and advantages of the completed article, I have illustrated the invention in detail in the accompanying drawing, throughout the several views of which like reference characters refer to the same parts.

In this drawing:

Figure 1 illustrates diagrammatically the method of progressively producing the continuous tubing and the manner of severing it into lengths;

Fig. 2 shows the dividing of each of such lengths into a number of units and at the same time cutting through the outer layers of each unit between its ends, the terminal portions of the original length of tubing being removed to true and smooth up its ends;

Fig. 3 depicts in longitudinal section one of such units;

Fig. 4 portrays the manner of longitudinally displacing the inner layers of the units and the cutting off of their end portions;

Fig. 5 illustrates the complete container or receptacle in section, the bottom and top having been applied thereto; and Fig. 6 shows the two complementary or companion telescoping parts of the container separated to more clearly illustrate the cover and the neck of the body over which it is adapted to snugly fit.

Referring to the drawing, it will be perceived that the manner of making the receptacle or container comprises initially winding spirally or helically around a suitable cylindrical mandrel or core 10 a strip or ribbon 11 of strawboard, pasteboard, cardboard, or any other suitable material from a supply or stock roll 12, such strip or band extending beneath the mandrel as shown, that is to say, it is fed to its under portion.

The relation of the mandrel or core and the pasteboard strip is such that as the latter is wound thereon its spirally-disposed edges just meet, whereby such strip completely covers the mandrel without substantial space between its adjacent margins.

Wound spirally on the core over such first layer is a second strip of pasteboard 13 from a supply spool 14 passing over and in contact with a glue applying roller 15, such second layer being offset longitudinally of the formed tubing with relation to the first layer and cemented or adhered thereto by the interposed coating of glue.

In similar manner a third strip or ribbon of pasteboard 16 unreeled from a supply or stock roll 17 and parallel to the band 13 is spirally wound on the mandrel over the two underlying layers, but no glue is applied to such third strip whereby the latter is not caused to adhere to the layer beneath.

Also a fourth strip 18 is unwound from a supply roll 19, passed over and in contact with a glue-roller 20, and spirally wound on top of the three layers below, all of such layers being offset or displaced with reference to one another, whereby each covers the joint or seam of the one beneath.

As is clearly shown in Fig. 1, the first strip is fed to the mandrel in an oblique direction from one side of the latter, whereas the remaining three strips are fed in parallel spaced relation all aslant or inclined with the mandrel and on the side thereof opposite the first strip.

Thus layers one and two are glued together and layers three and four in like manner secured together, but the two sets or groups although wound over one another are otherwise free.

In order to effect the rotation of the forming tubing and its simultaneous longitudinal displacement or travel, two pulleys 21 and 22, both of which are power-driven, are arranged oblique to the tubing and mandrel, as shown, and provided with a rubber or other suitable belt 23 which is wrapped once around the tubing at 24, being crossed at 25 where it extends from one pulley direct to the companion one.

In addition, the appliance includes a saw or cutter 28 mounted to travel lengthwise with the moving tube from the dotted line position 29 to the full line position illustrated during which travel the saw severs or cuts off a length 27 of the tubing during the temporary travel of the cutter with the tubing.

Afterward the cutter returns to the original or initial dotted line position to again move forward with and across the tubing to cut off the next length.

All of the construction so far described is old and well known in the trade, except the omission of the application of an adhesive to the third pasteboard strip 16, which is novel and important as will be seen from the remainder of the process or method of manufacture described hereinafter.

Each automatically severed length of tubing, comprising four layers 44, 45, 46 and 47, composed of the four spirally wound strips 11, 13, 16 and 18, is placed on a mandrel 34 and during its revolution is cut into a number of units or parts 30, 31, 32 and 33 and its ends trimmed off at the same time by five rotary cutters 35, 36, 37, 38 and 39 and simultaneously each such unit is cut entirely around its periphery at 48 through the two outer layers 44 and 45 only by the knives 40, 41, 42 and 43.

Thereupon the two inner layers 46 and 47 of each such unit tube are displaced or shifted slightly lengthwise the unit as shown in Fig. 4 and the protruding portion thereof is removed by a cutter 49.

Then a metal or other suitable bottom 50 is affixed to that end of the tube at which all ends of the four superposed layers are flush or even, and a top cap 51 is secured to the other end of the two outer layers only, whereby the complete container comprises a main body with a bottom 50 and a neck 53 and the cover or cap has a top 51 and a flange or rim 52 adapted in the assembled position of the parts to fit snugly over the neck.

The closeness or firmness of the fit of the cover flange or rim 52 over the neck 53 may to some extent be determined or varied by modifying the tension of the more or less elastic belt 23, whereby the tightness of the wrapping of the layers on one another may be controlled or governed.

One purpose of the container or receptacle is its employment as a mailing tube and when so used the cover should, by its friction on the neck, be free from dislodgment under normal service conditions.

The object of cutting off or removing the ends of the two inner layers as shown in Fig. 4 is to compensate or make room for the bottom and top end members 50 and 51 which extend into the ends of the tube somewhat and are crimped or clamped in position, this construction permitting the edges of the outer layers of the container body and the edges of the cover flange or rim to come into contact when the cover is in position.

If such inner layers were not thus cut off, these edges would be held apart, as will be readily understood, although in some cases such a receptacle satisfactorily performs its intended fuction.

In the production of receptacles of this kind in the manner indicated, there is practically or substantially no waste of material, the only loss, which is really not a waste or disadvantage, being the small amount of material removed from the inner layers to permit the application of the end members without causing a gap or space between the edges of the main body and cover.

Even though the two inner and the two outer layers are not glued together by reason of the absence of the application of glue to the third strip 16, nevertheless all four layers are firmly and securely held against relative movement or dislodgment by the bottom member 50 between the central inwardly-extended and the outer flange portions of which the several layers are fixedly and immovably held.

Those skilled in this art will readily understand that the invention is not limited and restricted to the precise and exact details herein presented and is subject to more or less radical changes in actual structure and in the steps of the process without departure from its substance and essence and without the sacrifice of any of its substantial benefits and advantages.

I claim:—

1. The method of making a container comprising shaping a strip of material into tubular form, shaping a second strip of material into tubular form over said first strip, thereby providing a multi-layer tube, cutting around said tube between its ends through said outer layer only, applying a bottom to one end of said tube, and applying a top to the other end of said tube.

2. The method of making a container comprising shaping a strip of material into tubular form, shaping a second strip of material into tubular form over said first strip, thereby providing a multi-layer tube, cutting around said tube between its ends through said outer layer only, shifting said inner layer lengthwise the tube relative to said outer layer, shortening said inner layer, applying a bottom to one end of said tube, and applying a top to the other end of said tube.

3. The method of making a container comprising shaping a strip of material into tubular form, shaping a second strip of material into tubular form over and causing it to adhere to said first strip, shaping a third strip into tubular form over said two underlying layers, shaping a fourth strip into tubular form over and causing it to adhere to said third layer, thereby providing a multi-layer tube with the second and third layers unadhered together, cutting around said tube between its ends through the third and fourth layers only, applying a bottom to one end of said tube, and applying a top to the opposite end of said tube.

4. The method of making a container comprising shaping a strip of material into tubular form, shaping a second strip of material into tubular form over and causing it to adhere to said first strip, shaping a third strip into tubular form over said two underlying layers, shaping a fourth strip into tubular form over and causing it to adhere to said third layer, thereby providing a multi-layer tube with the second and third layers unadhered together, cutting around said tube between its ends through the third and fourth layers only, shortening said first and second layers, applying a bottom to one end of said tube, and applying a top to the opposite end of said tube.

5. The method of making a container comprising shaping a strip of material into tubular form, shaping a second strip of material into tubular form over and causing it to adhere to said first strip, shaping a third strip into tubular form over said two underlying layers, shaping a fourth strip into tubular form over and causing it to adhere to said third layer, thereby providing a multi-layer tube with the second and third layers unadhered together, cutting around said tube between its ends through the third and fourth layers only, shifting said first and second layers lengthwise the tube relative to said third and fourth layers, shortening said first and second layers, applying a bottom to one end of said tube, and applying a top to the opposite end of said tube.

6. The method of making containers comprising spirally winding a strip of material to form a tube, spirally winding a second strip of material in offset relation to and over said first tube, cementing said strips together, spirally winding a third strip over said two underlying strips, spirally winding a fourth strip in offset relation to and over said third strip, cementing said third and fourth strips together, cutting around said multi-layer tube between its ends through the outer two layers only, applying a bottom to one end of said tube, and applying a top to the opposite end of said tube.

7. The method of making containers, comprising spirally winding a strip of material to form a tube, spirally winding a second strip of material in offset relation to and over said first strip, cementing said strips together, spirally winding a third strip over said two underlying strips, spirally winding a fourth strip in offset relation to and over said third strip, cementing said third and fourth strips together, cutting around said multi-layer tube between its ends through the outer two layers only, cutting off a portion of the length of said two inner layers, applying a bottom to one end of said tube, and applying a top to the opposite end of said tube.

8. The method of making containers, comprising spirally winding a strip of material to form a tube, spirally winding a second strip of material in offset relation to and over said first strip, cementing said strips together, spirally winding a third strip over said two underlying strips, spirally winding a fourth strip in offset relation to and over said third strip, cementing said third and fourth strips together, cutting around said tube between its ends through the outer two layers only, shifting the position of the two inner layers lengthwise relative to the two outer layers, cutting off a portion of the length of said displaced inner layers, applying a bottom to one end of said tube, and applying a top to the opposite end of said tube.

9. The method of making containers, comprising continuously spirally winding a strip of material to form a tube, continuously spirally winding a second strip of material in offset relation to and over said first strip, continuously cementing said strips together, continuously spirally winding a third strip over said two underlying strips, continuously spirally winding a fourth strip in offset relation to and over said third strip, continuously cementing said third and fourth strips together, severing said progressively formed multi-layer tube into lengths, simultaneously severing each length into units of shorter lengths, and simultaneously cutting around said units through the outer two layers only, applying a bottom to one end of each unit, and applying a top to the opposite end of each unit.

10. The method of making containers, comprising continuously spirally winding a strip of material to form a tube, continuously spirally winding a second strip of material in offset relation to and over said first strip, continuously cementing said strips together, continuously spirally winding a third strip over said two underlying strips, continuously spirally winding a fourth strip in offset relation to and over said third strip, continuously cementing said third and fourth strips together, severing said progressively formed multi-layer tube into lengths, simultaneously severing each length into units of shorter lengths and simultaneously cutting around said units between their ends through the outer two layers only, shifting the position lengthwise of said inner two layers of each unit relative to said outer two layers, cutting off the protruding portion of the length of said displaced inner layers, applying a bottom to one end of each unit, and applying a top to the opposite end of each unit.

11. The method of making a container, comprising continuously spirally winding a strip of material to form a tube, simultaneously continuously spirally winding a second strip of material in offset relation over said first strip thereby continuously forming a tube with a plurality of superposed layers of material, severing lengths from said progressively formed tube, cutting said lengths into a plurality of shorter units, cutting around each unit through its outer layer only, applying a bottom to one end of each unit, and applying a top to the opposite end of each unit.

12. The method of making a container, comprising continuously spirally winding a strip of material to form a tube, simultaneously continuously spirally winding a second strip of material in offset relation over said first strip, thereby continuously forming a tube with a plurality of superposed layers of material, severing lengths from said progressively formed tube, cutting said lengths into a plurality of shorter units, cutting around each unit through its outer layer only, shortening said inner layer, applying a bottom to one end of each unit, and applying a top to the opposite end of each unit.

THOMAS W. RITCHIE.